United States Patent [19]

Suzuki

[11] 4,101,732
[45] Jul. 18, 1978

[54] START AND STOP SYSTEM

[75] Inventor: Seigo Suzuki, Yokohama, Japan

[73] Assignee: Tokyo Shibaura Electric Co., Ltd., Japan

[21] Appl. No.: 733,926

[22] Filed: Oct. 19, 1976

[30] Foreign Application Priority Data

Oct. 20, 1975 [JP] Japan .................................. 50-126216

[51] Int. Cl.² ............................................. H04L 5/24
[52] U.S. Cl. .......................... 178/53.1 R; 340/167 R
[58] Field of Search ............... 178/53.1 R; 340/167 R, 340/168 R

[56] References Cited

U.S. PATENT DOCUMENTS

| 3,308,434 | 3/1967 | Glasson | 178/53.1 R |
|---|---|---|---|
| 3,404,233 | 10/1968 | Mason | 178/53.1 R |
| 3,419,679 | 12/1968 | Elvis | 178/53.1 R |
| 3,492,423 | 1/1970 | Schilling | 178/53.1 R |

Primary Examiner—Benedict V. Safourek
Assistant Examiner—Michael A. Masinick
Attorney, Agent, or Firm—Finnegan, Henderson, Farabow & Garrett

[57] ABSTRACT

A start and stop control apparatus used in controlling the transmission of a series of data frames each showing a character and each composed of start bit, data and stop bit pulses. The apparatus is so designed as to generate a new sampling pulse for every data frame. A number N of binaries "0" which corresponds to the width of the start bit in each data frame are written into a shift register in response to clock pulses. Upon completion of the writing of binaries "0", the shift register forms a loop. A binary "1" is then written into the shift register in place of the N/2th binary "0" when N is even and N±1th/2 binary "0" when N is odd. Every time the binaries "0" and the binary "1" are circulated in the looped shift register in response to clock pulses, there is obtained from the shift register a sampling pulse by which the data pulses are sampled.

4 Claims, 2 Drawing Figures

START AND STOP SYSTEM

BACKGROUND OF THE INVENTION

The present invention relates to a start and stop control apparatus for a serial data transmission system.

A proper data transmission requires some data transmission controls. In the asynchronous data transmission system, information is transmitted in a series of pulses. It is necessary, therefore, to clarify the section of the pulses representing one unit of information, e.g. a character. This necessitates the synchronization between transmission and receiving sides. The start and stop control apparatus is a timing or control apparatus. In the start and stop control apparatus, an input data is of a serial data in which one bit pulse corresponds to, for example, 8 or 16 clock pulses. The data is provided at the beginning with a start bit pulse and at the end with a stop bit pulse. The synchronization is taken to the data in each data frame bounded by the start bit pulse and the stop bit pulse. In the conventional start and stop control apparatus, the start bit pulse is allotted by a pregiven number of pulses, for example, 16 clock pulses, and the 16th/2 pulse, i.e. the 8th pulse, is used for data sampling. However, in the prior art start and stop control apparatus the basic clock pulse for the data sampling is asynchronous with respect to the data to be transmitted and received, the start bit pulse is fixed with 16 clock pulses, and the 8th pulse of 16 clock pulses, is used as the sampling pulse for data sampling. Accordingly, where some reason causes the frequency of the clock pulses to change, the width of the start bit pulse is changed relative to the frequency of the clock pulse. As the result, when the respective pulses of the data are sampled by the sampling pulse corresponding to the center of the start bit pulse having the changed pulse width, the data sampling is shifted off from the center of the data bit pulse as the data sampling approaches the last data bit pulse in the data frame. Finally, the last data pulse is sampled in a state shifted off from the center of the pulse more than 8 clock pulses, as a result of accumulation of the successive shifting off. This causes a transmission error.

Let us consider now the case that the start and stop control apparatus is applied for the data transmission between a data processor and an input/output device (I/O device). In the case, the data transmission from the data processor needs individual clock pulse generators for the serial interface and the I/O device. The reason for this is that I/O devices have transmission rates peculiar to them, respectively, for example, 110 bit/sec for the teletype, 9600 bit/sec for the cathode ray tube display. It is desirable that the clock pulse from the clock pulse generator at the transmission side is made in synchronism with that of the clock pulse generator at the I/O device. In this case, in addition to the data bus, a control bus, for example, must be provided, with the result that, if the I/O device is located at a remote place, the start and stop control apparatus is disadvantageous from an economical standpoint, and it is impossible to correctly transmit high frequency pulses.

SUMMARY OF THE INVENTION

Accordingly, an object of the present invention is to provide a start and stop control apparatus eliminating the shifting-off sampling of each bit pulse of the data in each data frame.

According to the present invention, there is provided a start and stop control apparatus in which a sampling pulse is set up for every data frame of a series of data frames.

Other objects and features of the present invention will be apparent from the following description, taken in connection with the accompanying drawings, in which:

DETAILED DESCRIPTION OF THE PREFERRED EMBODIMENTS

Explanation will be given of the principle of a start and stop control apparatus of the present invention. Referring to a time chart in FIG. 1 just before the start of the data transmission, the stop bit pulse Sp of the data previously transmitted is "1" in signal level. If the start bit pulse St of "0" level appears at time $t_0$, the clock pulses generated from an interface circuit at the transmission side are counted in response to the start bit pulse St and the counting operation of the clock pulse continues till the time $t_1$ at which the start bit pulse St changes its level from "0" to "1". If the number of the clock pulses counted is N (for example, even number), the N/2 th pulse of the counted pulses is extracted to be used as a sampling pulse. In the case of an odd number of N + 1, the sampling pulse corresponds to the (N+1)−1/2th or (N+1)+1/2th pulse.

The data bit pulses commencing from time $t_2$ are sampled for every data bit pulse by the sampling pulse and its sampling terminates at time $t_3$. The stop bit pulse Sp of "1" level follows the sampled data. The stop bit pulse exists until the ensuing data is fed, i.e. the ensuing start bit St appears. When the next start bit St appears at $t_4$, the count of the clock pulse commences, as in the previous case. If the number of the clock pulses counted to the start bit pulse St is M (M ≠ N), the M/2 th or M ± 1/2 th pulse is used as the sampling pulse for the next data frame.

As described above, the number of the clock pulses is counted for every start bit pulse, the clock pulse corresponding to one-half of the number of the clock pulses being extracted as the sampling pulse. In other words, since the sampling pulse is set up for every data frame, the sampling pulse samples the data without any shifting-off, thus ensuring a correct data transmission of series data.

Figure 2:
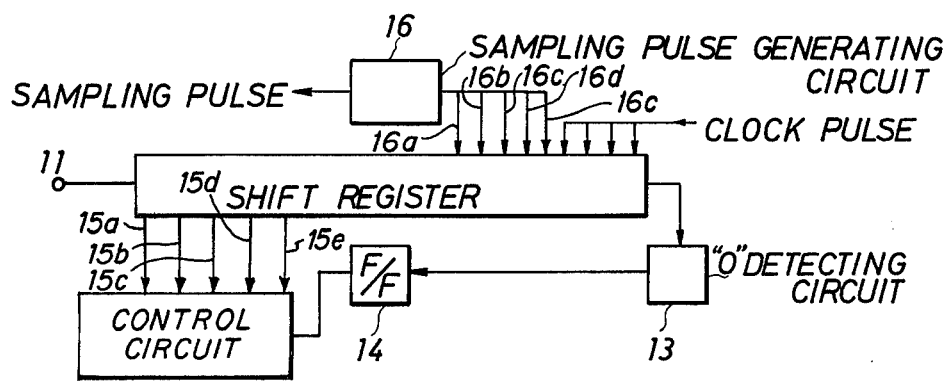
FIG. 2 is a block diagram of an embodiment of a start and stop system according to the present invention.

An embodiment of a start and stop control apparatus of the present invention will be described with reference to FIG. 2.

In the figure, a shift register 12 of a plurality of stages performs a shift operation in response to the clock pulse. A zero level detecting circuit 13 is connected with the output of the shift register 12. The zero level detecting circuit is used for detecting the "0" level from the shift register 12. The zero level detecting circuit 13 is further coupled with a flip-flop 14 which is set in response to the output of the detector circuit 13. The output of the flip-flop circuit 14 is applied to a control circuit 15. The control circuit 15 is provided to determine a length of the shift register 12 in response to the output of the flip-flop circuit 14 and has a plurality of terminals 15a, 15b, 15c, 15d, 15e connected to a predetermined number of stages as counted from the first stage adjacent to the input terminal 11 of the shift register, respectively.

The shift register 12 is further coupled with a sampling pulse output circuit 16 having a plurality of terminals 16a, 16b, 16c, 16d and 16e connected respectively to a plurality of mid stages of the shift register 12 as counted from the middle stage toward the output of the shift register 12. The middle stage corresponds substantially to the middle part of the entire length of the shift register.

Figure 1:
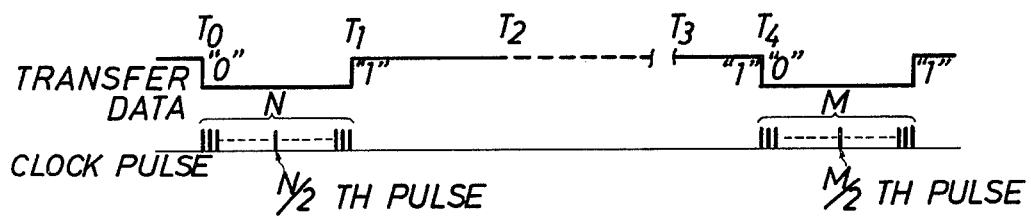
FIG. 1 is a time chart for illustrating the principle of the present invention.

It will now be described how the above-mentioned start and stop control apparatus operates, with reference to the time chart of FIG. 1.

Just before the data transmission is started, the stop bit pulse St of the previous data having a "1" level appears at the input terminal 11. A binary "1" signal is therefore stored in the stages of the shift register 12. Under this condition the start bit pulse St of "0" level of a new data frame is applied at time $t_0$ to the shift register 12 through the input terminal 11, and binaries "0" are successively written into the shift register 12 in synchronism with clock pulses. The binaries "0" are shifted toward the output of the shift register 12, and the binary "0" is detected by the zero level detecting circuit 13 when it reaches the output of the shift register 12. The output of the detecting circuit 13 sets the flip-flop 14. Then, the set output of the flip-flop 14 actuates the control circuit 15, which cuts the supply of input to the shift register 12 from the input terminal 11. At the same time the shift register 12 is looped with the register length, which length corresponds to the number N of stored binaries "0" and thus to the width of the start bit pulse or period between time $t_0$ and time $t_1$.

When the control circuit 15 detects the rearmost binary "0" of a series of binaries "0" from the shift register 12 through, for example, the terminal 15c, the sampling pulse output circuit feeds a binary "1" into the shift register 12 through the terminal 16c. Since the stage connected to the terminal 16c corresponds to the middle point of the register length measured from the stage connected to the terminal 15c of the control circuit 15, the binary "1" is written into the stage at the middle point of the looped shift register 12, i.e., the N/2th stage storing a binary "0" when N is even and N±1/2th stage when N is odd. Thereafter, the binary "1" and the binaries "0" are shifted in the shift register 12 in response to clock pulses. When the sampling pulse output circuit detects the binary "1" in the N/2th or N±1/2th stage through terminal 16c, it generates a sampling pulse. The periodically generated sampling pulses provides a sampling of each bit of the data within the time interval from $t_2$ to $t_3$ from the central point of the data. The stop bit pulse Sp of "1" level follows the last data bit pulse of the data group all of which have been sampled.

When the start bit pulse St of the next i.e. the second data frame is supplied to the shift register 12, the shift register 12 successively stores "0" in response to the clock pulses, as in the case of the previous data frame. Assume at this time that some reason causes the frequency of the clock pulse to differ from that of the clock pulse of the previous case, and an M-number of binary "0" (M ≠ N) is stored in the shift register 12. In this case, the output circuit 16 generates the sampling pulse corresponding to the M/2 or M ± 1/2 th binary "0". The second data frame is periodically controlled by the new sampling pulse.

As described above, according to the present invention, the substantial central point of the start bit pulse located at the head of each data frame is obtained as in the manner described above. That is, the number of the clock pulses corresponding to the width of the start bit pulse is set not fixedly but flexibly. More precisely, the stage number forming the loop of the shift register is changed every data frame, i.e. every start bit pulse, and the sampling pulse is extracted corresponding to the center of the stage number. The result is that variation of the clock pulse frequency brings about no displacement of the data sampling position, thereby eliminating data error occurrence.

This invention can be applied to the case where the clock pulse frequency is constant but the width of the start bit pulse varies or both the clock pulse frequency and the width of the start bit pulse are relatively varied.

The entire register length of the shift register 12 employed in the above-mentioned embodiment must be longer than the information train having the number of binary "0" corresponding to the width of the start bit pulse which is produced in response to the clock pulses having the minimum frequency and shorter than the information train having the number of binary "1" corresponding to the stop bit width.

It is for this reason that, if the entire register length of the shift register 12 is longer than that of the "1" bit information train of the stop bit width, it is impossible to fill the shift register 12 with binary "1" before the data transmission, and if it is shorter than that of the minimum "0" information train of the start bit, it is impossible to extract the sampling pulse from the shift register 12.

What is claimed is:

1. A start and stop control apparatus for successively transferring a plurality of data frames each including start, data and stop bit pulses, comprising:

a shift register having a plurality of stages for continuously storing binary first information items corresponding to the start bit pulse of each data frame in response to a series of clock pulses;

a detector circuit for generating an output in response to the binary first information item corresponding to the head of the continuous binary first information items stored in the shift register, which has been delivered from the output terminal of said shift register;

a control circuit for looping the shift register with a register length corresponding to the number N of the continuous binary first information items in response to the output from said detector circuit and for detecting the last stage of the looped shift register;

a sampling pulse output circuit for storing a binary second information item into the N/2th stage of the shift register in response to the detected last stage and for generating a sampling pulse in response to said binary second information item every time said shift register finishes one loop operation with said register length;

means for sampling data from the middle portion of each of said data bit pulses in response to said sampling pulse from said sampling pulse output circuit; and means for storing binary second information items throughout the shift register in response to the stop bit pulse of each data frame.

2. A start and stop control apparatus according to claim 1, wherein the entire register length of said shift register is shorter than a series of the continuous information items corresponding to the width of the stop bit pulse and longer than a series of the continuous information items corresponding to the width of the start bit pulse.

3. A start and stop control apparatus according to claim 1, wherein said binary first information items have a binary "0" level and said binary second information item has a binary "1" level.

4. A start and stop control apparatus according to claim 1, wherein said shift register comprises N stages, said control circuit and sampling pulse output circuit each including a predetermined number of terminals, the terminals of the control circuit being coupled to the first stage, second stage, third stage, . . . of said shift registers, respectively and the terminals of the sampling pulse output circuit being coupled to N/2th stage, [(N/2)+1]th stage, [(N/2)+2]th stage, . . . of said shift register, respectively.

* * * * *